United States Patent Office 2,768,124
Patented Oct. 23, 1956

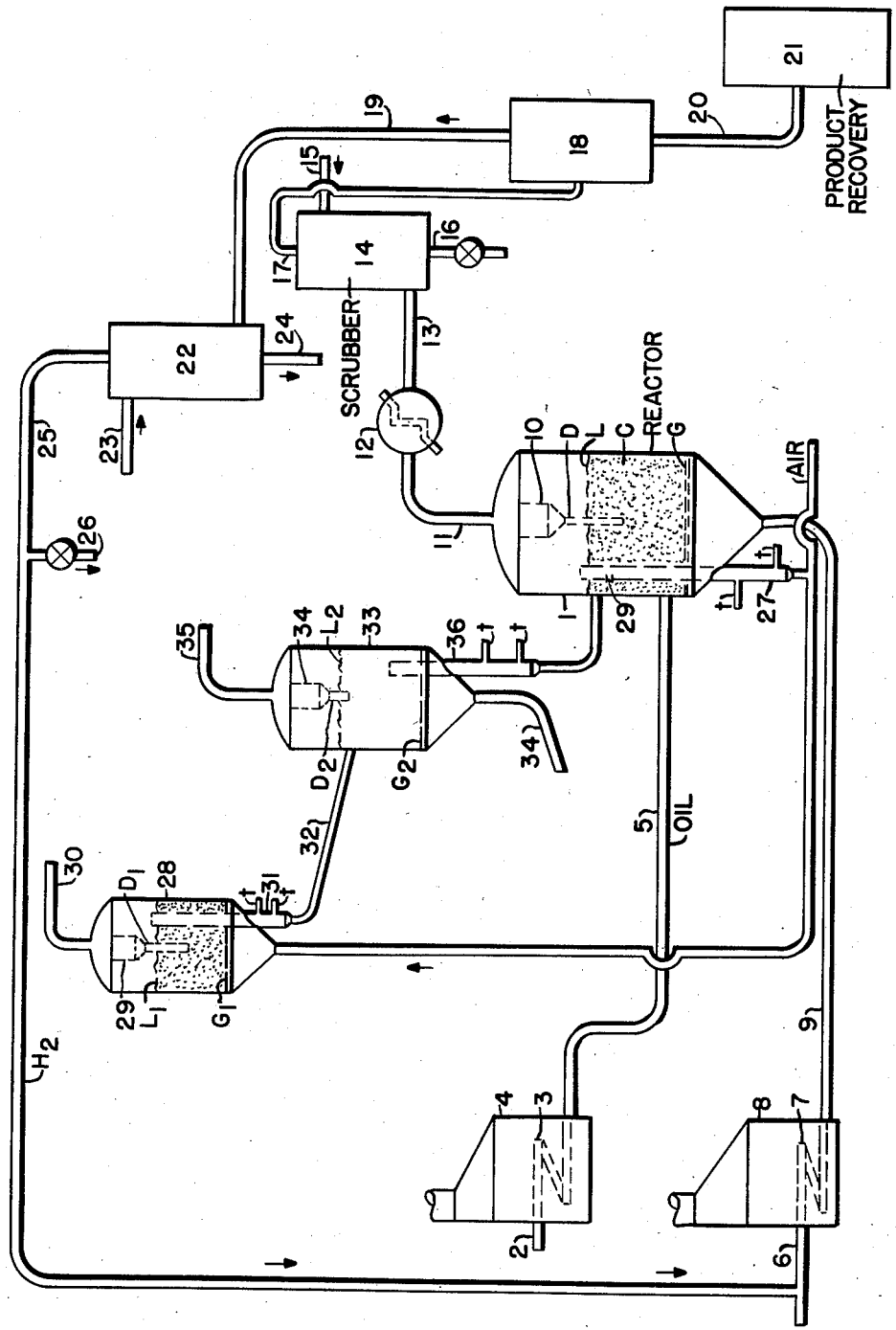
Robert L. Berg
George D. Ward
Inventors
By J. Cashman Attorney

2,768,124

FLUID HYDROFORMING

Robert L. Berg, Westfield, and George D. Ward, Plainfield, N. J., assignors to Esso Research and Engineering Company, a corporation of Delaware Application March 25, 1953, Serial No. 344,641

1 Claim. (Cl. 196—50)

The present invention relates to improvements in the hydroforming of naphthas. In particular the present invention relates to improvements in suplying heat to the highly endothermic hydroforming reaction.

Hydroforming is defined as an operation in which a petroleum naphtha is contacted at elevated temperatures and pressures and in the presence of added hydrogen with a solid catalytic material under conditions such that there is no net consumption of hydrogen. In the hydroforming operation it is necessary for best results to utilize a feed stock containing a substantial quantity of naphthenic hydrocarbons, say from about 35 to 50 volume per cent, and usually the feed stock boils substantially within the range of from about 200°–350° F. The light ends, in other words, the material boiling from about 0°–200° F., is not subjected to this reaction, for the reasons that the virgin naphtha light ends have a fairly good octane rating and that the materials boiling in this range when subjected to hydroforming produce an inordinately large amount of coke.

Hydroforming operations are ordinarily carried out in the presence of hydrogen or hydrogen-rich recycle gas at temperatures of 750°–1150° F. in the pressure range of about 50 to 1000 lbs. per square inch, and in contact with such catalysts as molybdenum oxide, chromium oxide, or, in general, oxides or sulfides of metals of groups IV, V, VI, VII and VIII of the periodic system of elements alone, or generally supported on a base or spacing agent such as alumina gel, precipitated alumina or zinc aluminate spinel. A good hydroforming catalyst is one containing about 10 weight per cent molybdenum oxide upon an aluminum oxide base prepared by heat treating a hydrated aluminum oxide or upon a zinc aluminate spinel.

The chemical reactions involved in the hydroforming process include dehydrogenation of naphthenes to the corresponding aromatics, isomerization of straight chain paraffins to form branched chain paraffins, isomerization of cyclic compounds such as ethylcyclopentane to form methylcyclohexane, and some hydrocracking of paraffins. In a hydroforming operation which is conducted efficiently it is possible with the use of a proper catalyst and proper conditions of operation to hydroform a virgin naphtha having an octane number of about 50 to a hydroformate having an octane number of from 95 to 98 and obtain yields of $C_5+$ hydrocarbons as high as 85%.

It has been proposed in application Serial No. 188,236, filed October 3, 1950, now Patent No. 2,689,823, to effect the hydroforming of naphtha fractions in the presence of a dense fluidized catalyst mass in a fluidized solids reactor system in which napta vapors are passed continuously through the dense, fluidized bed of hydroforming catalyst particles in a reaction zone, spent catalyst particles being withdrawn from the dense bed in the reaction zone and passed to a separate regeneration zone where inactivating carbonaceous deposits are removed by combustion whereupon the regenerated catalyst particles are returned to the main reactor vessel. Fluid hydroforming as thus conducted has several fundamental advantages over fixed bed hydroforming such as (1) the operations are continuous, (2) the vessels and equipment can be designed for single rather than dual functions, (3) the reactor temperature is substantially constant throughout the bed, and (4) the regeneration or reconditioning of the catalyst may be readily controlled.

One of the main problems in carrying out a hydroforming operation is that of supplying heat to support the highly endothermic reaction. Some heat may be supplied to the reaction zone in the preheat of the oil feed, but since the napthenes contained in the feed are subject to thermal cracking if the preheat temperature exceeds about 900° F., of course, there is a limitation on the amount of heat that may be added in this manner. Another method of adding heat to the reactor is through the sensible heat contained in the hot regenerated catalyst. However, since hydroforming catalysts as a class are injured when heated to about 1050°–1150° F., there is a further limitation on the amount of heat that can be transferred from the regenerator to the reactor by the hot regenerated catalyst. Furthermore, with respect to adding heat by means of a hot regenerated catalyst, it is pointed out that the catalyst to oil ratio, in other words, the weight of catalyst per weight of oil which may be transferred to the reactor from the regenerator, is limited to about 1, for catalyst to oil ratios above 1 result ordinarily in the formation of excessive coke.

Another way to supply heat to the reaction zone is by high recycle gas rates, heating the hydrogen-containing gas to a temperature of 1200°–1400° F. However, since the reaction products are usually cooled to about 100° F. before the hydrogen is separated therefrom, the cost of reheating this recycle gas is quite expensive.

The present invention involves improvements in supplying heat to the reaction zone, and briefly involves treating the recycle gas containing $C_1$ to $C_8$ hydrocarbons and hydrogen separated from the product to scrub out a major proportion of the $C_4$ and higher hydrocarbons associated therewith, but to leave in the recycle gas the lower normally gaseous paraffins such as ethane and propane. The $C_5$ and lower hydrocarbons predominate in the recycle hydrocarbon components. The recycle gas containing the remaining constituents is then passed through a heating coil or other suitable heating means at temperatures sufficiently high to cause dehydrogenation of these paraffins to form olefins. These olefins are then fed to the reaction zone wherein they are hydrogenated with the release of heat in situ, thus supplying a substantial portion of the heat necessary to support the hydroforming reaction and of course reducing the amount of heat required in the preheating coil and in the hot regenerated catalyst. The hydrogenated olefins are then again dehydrogenated in the heating coil and a cyclic process utilized.

In the accompanying flow diagram in the drawing there is shown diagrammatically an apparatus layout in which a preferred modification of the present invention may be carried into effect.

Referring in detail to the drawing, 1 represents a reaction zone which may have the form of a cylinder provided with a convex crown piece and a conical base and which contains a bed of fluidized powdered hydroforming catalyst C extending from a grid or screen or other gas distributing means G to an upper gas phase level L. The naphtha to be reformed, after being preheated by heat exchange, enters the system through line 2 and is discharged to a fired coil 3 disposed in a suitable furnace or other heating means 4 wherein the coil is heated to a temperature of from about 800°–900° F. The vaporized and superheated oil is withdrawn from coil 3 through line 5 and charged into the lower portion of the bed of catalyst C above the grid G in the hydroforming reaction zone 1. Simultaneously "recycle" gas, that is to say, hydrogen-containing gas, is sent after heat exchange to line 6 and thence charged to a coil 7 disposed in a furnace 8 wherein it is heated to a temperature of about 1500° F. This recycle gas contains normally gaseous hydrocarbons such as ethane and propane which are dehydrogenated to form olefins. The preheated hydrogen-containing gas is withdrawn from coil 7 through line 9 and charged into the bottom of reactor 1. It is to be noted that the oil and the hydrogen-containing gas are not mixed prior to their entry into the bed of catalyst C. The gasiform material, that is to say, the vaporized oil and the hydrogen-containing gas, pass upwardly through the bed of catalyst at a superficial velocity of from about ½ to 3 feet per second, whereby a dense turbulent fluidized mass of catalyst is obtained, extending, as previously stated, from G to L. Under conditions more fully set forth hereinafter in the form of a specific example, the desired conversion takes place and the crude product is withdrawn from the dense bed and passed upwardly through a dilute phase suspension of catalyst and gasiform material, which dilute phase extends from L to the top of the reactor. Before the crude product is withdrawn from the reactor it is forced through one or more gas-solids separating devices 10 (one shown) wherein entrained catalyst is separated from the gases and returned to the dense bed through one or more dip pipes D. The crude product is withdrawn overhead from the reactor through line 11, thence passed through a cooler 12 wherein it can be cooled by heat exchange with cold feed to preheat the latter and/or recycle gas. The cooled product is withdrawn from cooler 12 via line 13 and thence charged into a scrubber 14.

A heavy oil is charged to scrubber 14 through line 15 and passes downwardly countercurrent to the upflowing gasiform material charged to the scrubber via line 13. The heavy oil cools the vapors sufficiently to condense heavy polymer, which is rejected from the system through line 16. The amount of this heavy polymer material is usually not more than about 2 volume per cent based on feed. The uncondensed material is withdrawn overhead from scrubber 14 through line 17 and thence passed after cooling into a separation drum 18. From separation drum 18 the hydrogen-containing recycle gas is taken off overhead through line 19. A bottoms fraction is taken off through line 20, and this material, which contains the desired hydroformate product, is delivered to a product recovery system 21, where it is distilled and otherwise treated according to conventional means to recover the desired product.

Referring again to the overhead gasiform material in line 19, this material is predominantly hydrogen, say in a concentration by volume of from 50 to 70 percent. The gasiform hydrocarbon material in this stream is for the most part $C_1$–$C_5$ hydrocarbons. This material is passed into an absorber 22 wherein it is treated with a hydrocarbon oil introduced to the top of the absorber from line 23. The absorbing oil flows downwardly in 22 and serves to remove by absorption the $C_4$ and heavier hydrocarbons in the upflowing gasiform material. The fat oil containing the removed hydrocarbons is withdrawn through line 24. Of course, this oil may be distilled to remove hydrocarbons and recharged to absorber 22 through line 23. The hydrogen-containing gas containing hydrogen and $C_1$–$C_3$ hydrocarbons is withdrawn from absorber 22 through line 25 and recycled to line 6. A portion of this material is rejected from the system through line 26. The recycle material in passing through the coil 7 in furnace 8 is heated at a temperature sufficiently high to dehydrogenate the ethane and propane to the corresponding olefins. This material is then withdrawn through line 9 and fed into the reactor as previously indicated.

Since during the hydroforming operation the catalyst C in reactor 1 becomes contaminated with carbonaceous and other deposits, it is necessary to regenerate the catalyst. Toward this end catalyst is withdrawn from the reactor 1 through a standpipe 27 and charged into an air stream where it is formed into a suspension and conducted into the bottom of a regenerator 28.

Referring again to standpipe 27, the same is provided with a plurality of gas taps $t$ through which a fluidizing and stripping gas such as steam may be injected for the purpose of increasing the fluidity of the catalyst flowing therein and at the same time stripping the catalyst of adsorbed hydrocarbons. It will be noted that the upper end of this standpipe 27 projects above the dense phase level. The purpose of this is to prevent steam, if that is used as a fluidizing and stripping gas, from contacting the main body of catalyst in the dense phase, for steam has a deactivating effect on said catalyst. The catalyst flows from the dense phase into the standpipe through one or more ports 29.

Referring again to regenerator 28, this vessel may be of the same general form and construction as reactor 1, but is usually much smaller. It is provided with the usual gas distributing means G, which may be a screen or grid, and the gasiform material flows through the regenerator at a superficial velocity such as to maintain the catalyst undergoing regeneration in the form of a dense fluidized bed which will have an upper dense phase level at $L_1$. The superficial velocity will, of course, be of about the same order as that already disclosed in connection with the description of reactor 1. The gasiform material, which contains oxygen, removes the carbonaceous and other deposits from the catalyst by burning them off, and the regeneration fumes pass from the dense phase through a light phase suspension which extends from $L_1$ to the top of the regenerator. Before these fumes are rejected from the regenerator they are forced through one or more gas-solids separating devices 29 wherein catalyst entrained in the said fumes is removed and returned to the dense phase through one or more dip pipes $D_1$. The regeneration fumes are withdrawn from the reactor through line 30 and the sensible heat content thereof may be utilized in the present system in means not shown.

The regenerated catalyst is withdrawn from the regenerator through a standpipe 31. As usual, the standpipe 31 is provided with a plurality of gas taps $t$, through which a stripping and fluidizing gas may be injected for the purpose of increasing the fluidity of the downflowing catalyst and also to dislodge oxygen-containing gases adsorbed on the catalyst.

However, it may be desirable to pretreat the regenerated catalyst to reduce the valency of the molybdenum oxide. In other words, then, during the burning off of the carbonaceous material on the catalyst in the regenerator, the molybdenum oxide is oxidized to its maximum valence corresponding to the symbol $MoO_3$. It may be desirable to reduce this valence to a state corresponding to the symbol $Mo_2O_5$. Toward this end, therefore, the catalyst in line 32 may be charged to a pretreater 33, wherein it is treated with a hydrogen-containing gas charged to the pretreater through line 34, the pretreating gas passing upwardly through a gas distributing means $G_2$ into superficial contact with the catalyst under controlled velocity so as to form a fluidized bed extending from $G_2$ to $L_2$. The treating gas passes from the dense phase through a light phase, and preferably before removal from the pretreater it is passed through one or more gas-solids separating devices 34 wherein entrained catalyst is separated and returned to the dense phase through one or more dip pipes $D_2$. The treating gas substantially freed from entrained catalyst is withdrawn from the pretreater through line 35. The pretreated catalyst is then withdrawn from the pretreater through standpipe 36 and then returned to the reactor. This standpipe 36 is provided with the usual fluidizing gas taps $t$.

In order to explain the invention more fully, the following conditions of operation of the various parts of the system are set forth below.

*Conditions in reactor 1*

|  | Preferred | Range |
|---|---|---|
| Catalyst composition | 10% MoO₃ on alumina. |  |
| Temperature, °F | 920 | 875–950 |
| Pressure, p. s. i. g | 200 | 50–500 |
| Oil feed rate W./hr. feed/W. catalyst | .40 | 0.1–2.0 |
| Catalyst to oil ratio | .5 | 0.3–2.0 |
| Cu. ft. of recycled gas fed/bbl. of oil | 3,000 | 2,000–8,000 |
| Concentration of H² in recycle gas | 60% | 50–80% |
| Molal ratio of cracked olefins to naphthenes in feed | 0.7 | 0.5–2.0 |

*Conditions in regenerator 28*

|  | Preferred | Range |
|---|---|---|
| Temp., °F | 1,125 | 1,050–1,200 |
| Pressure, p. s. i. g | 200 | 50–500 |
| Residence Time, minutes | 10 | 5–100 |
| Fluidizing gas velocity ft./sec. | 0.5 | 0.3–2.5 |

*Conditions in pretreater 33*

|  | Preferred | Range |
|---|---|---|
| Temp., °F | 1,100 | 900–1,150 |
| Pressure, p. s. i. g | 200 | 50–500 |
| Residence time, minutes | 5 | 1–100 |
| Treating Gas | Recycle gas |  |
| Treating gas feed rate | 500 S. C. F./bbl. feed | 100–1,000 |

*Conditions in absorber 22*

|  | Preferred | Range |
|---|---|---|
| Lean oil rate, bbl./mm. S. C. F. recycle gas | 500 | 200–1,000 |
| Temperature, °F | 100 | 80–150 |
| Pressure, p. s. i. g | 190 | 40–500 |

*Conditions in cracking coil 7*

|  | Preferred | Range |
|---|---|---|
| Recycle gas rate, S. C. F./bbl. of feed | 3,000 | 2,000–8,000 |
| Coil outlet temperature, °F | 1,500 | 1,300–1,800 |
| Coil residence time, seconds | 1 | 0.3–2.0 |
| Olefin concentration in coil effluent, mol percent | 8 | 5–15 |

It may be desirable in order to improve yields to add a relatively small amount of water to the reactor. In other words, there may be charged to the reactor with the hydrogen-containing gas from about ¼ to 2 mol percent water, steam, or even oxygen, based on the hydrogen content of the recycled hydrogen-containing gas. In the same connection a small amount of water, say ¼ to 2 mol percent based on the hydrogen, may be fed with the said hydrogen to pretreater 33. Of course, an equivalent amount of oxygen may be used in place of water during the pretreatment of the catalyst.

The oils utilized to absorb the C₄ and higher hydrocarbons from the recycle gas are petroleum fractions such as heavy naphthas or heavier fractions. These oils boil in the 300°–700° F. range, preferably 300°–400° F.

The feed or charging stock to the hydroforming reactor can be a virgin naphtha, a cracked naphtha, a Fischer-Tropsch naphtha or the like. The feed stock is preheated alone or in admixture with recycle gas to reaction temperature or to the maximum temperature possible while avoiding thermal degradation of the feed stock.

The reactor system is charged with a mass of finely divided hydroforming catalyst particles. Suitable catalysts include Group VI metal oxides, such as molybdenum oxide, chromium oxide or tungsten oxide or mixtures thereof upon a carrier such as activated alumina, zinc aluminate spinel or the like. Preferred catalysts contain about 5 to 15 weight percent molybdenum oxide or from about 10 to 40 weight percent chromium oxide upon a suitable carrier. If desired, minor amounts of stabilizers and promoters such as silica, calcium oxide, ceria or potassia can be included in the catalyst. The catalyst particles are, for the most part, between 200 and 400 mesh in size or about 0–200 microns in diameter with a major proportion between 20 and 80 microns.

Increased yields of gasoline are obtained from the hydroforming through the removal of the butane and heavier components from the recycle gas due to the elimination of degradation of these heavier components by thermal cracking. The removal of these heavier fractions would permit an even higher recycle gas temperature if so desired.

This invention is further illustrated by the following example.

*Example*

An example of a normal fluid hydroforming design not using this invention operates with the following process conditions. The recycle gas rate is about 5000 s. c. f./bbl. of feed, and this recycle gas is preheated to 1200° F. before introduction into the reactor. This temperature is limited because of excessive cracking of valuable C₄ and heavier compounds in the recycle gas at temperatures above 1200° F. The naphtha feed is preheated to 1000° F. before introduction into the reactor. At this temperature a small amount of naphtha feed cracking takes place, resulting in product loss. The catalyst holdup in the reactor is 50 lbs./bbl. of feed. The catalyst to oil ratio is 1.0, and the carbon on feed is about 1.5 weight percent.

Using this invention results in substantial savings in the process. The recycle gas rate is cut to 3000 s. c. f./bbl. of feed. This results in substantial savings in reactor size, heat exchange surface, recycle compressors, and scrubber tower. The naphtha feed is preheated to only 850° F. At this temperature there is no cracking of the naphtha feed, which is, of course, desirable. The catalyst holdup in the reactor can be reduced to 30 lbs./bbl. of feed. Thus a smaller reactor results as well as a substantial catalyst saving. The catalyst to oil ratio can be reduced to 0.5. This results in savings in catalyst transfer equipment and in stripping steam. The reduced recycle gas rate may tend to produce more carbon, but the reduction in catalyst to oil is sufficient to offset this. For the above examples a heat of reaction of 330 B. t. u./lb. of feed is assumed. The hydrogenation of the olefins in the reactor produces approximately 130 B. t. u./lb. of feed. Thus approximately 40% of the heat requirement is supplied by the hydrogenation of these olefins.

The process of this invention also has utility in fixed bed operations.

It is to be understood that this invention is not limited to the specific examples which have been offered merely as illustrations, and that modifications may be made without departing from the spirit of the invention.

What is claimed is:

The method of hydroforming a virgin naphtha boiling substantially within the range of from about 200°–350° F. and containing from 35 to 50 volume per cent of naphthenes in a system comprising a hydroforming zone and a catalyst regeneration zone in which the catalyst is disposed in the form of fluidized beds in the said zones and wherein catalyst fouled by the deposition of carbonaceous material thereon in the hydroforming zone is transferred to the regeneration zone for regeneration and returned to the hydroforming zone at substantially regeneration temperatures, which comprises the steps of heating the said naphtha to a temperature of about 850° F.; charging the heated naphtha, together with a hydrogen-containing gas to a reaction zone containing a fluidized bed of powdered hydroforming catalyst comprising molybdenum oxide carried on alumina; simultaneously charging hot regenerated catalyst to the hydroforming zone at the rate of about 0.5 lb. of catalyst/bbl. of oil causing the gasiform material in said zone to flow upwardly in contact with the said powdered hydroforming catalyst at a superficial velocity of from about ½ to 3 feet per second; maintaining hydroforming conditions of temperature and pressure within said hydroforming zone; permitting the reactants to remain resident in said zone for a sufficient period of time to effect the desired hydroforming reaction; withdrawing product overhead from said hydroforming zone; separating a hydrogen-containing gas from the normally liquid constituents contained in said product; cooling the separated hydrogen-containing gas; scrubbing the cooled hydrogen-containing gas to remove $C_{4}+$ hydrocarbons; thereafter subjecting the hydrogen gas containing $C_1$, $C_2$, and $C_3$ hydrocarbons to temperatures of the order of about 1500° F. to dehydrogenate $C_2$ and $C_3$ hydrocarbons; and thereafter feeding the hydrogen-containing gas of increased heat capacity due to the presence of olefins to the hydroforming zone, at a rate of about 3000 s. c. f. of said gas/bbl. of naphtha feed to said hydroforming zone, wherein said olefins are hydrogenated with the release of exothermic heat in situ to supply the major portion of the heat necessary to support said hydroforming reaction.

References Cited in the file of this patent

UNITED STATES PATENTS

| | | |
|---|---|---|
| 2,194,280 | Grosse | Mar. 19, 1940 |
| 2,377,087 | Linn | May 29, 1945 |
| 2,398,674 | Schulze | Apr. 16, 1946 |
| 2,426,870 | Hill | Sept. 2, 1947 |
| 2,528,693 | Johnson | Nov. 7, 1950 |
| 2,656,304 | Mac Pherson | Oct. 20, 1953 |